(12) United States Patent
Bast

(10) Patent No.: US 11,952,158 B2
(45) Date of Patent: Apr. 9, 2024

(54) FOOD PACKAGING MACHINE TRACKING FOOD SAFETY DATA USING HASH TREES

(71) Applicant: TETRA LAVAL HOLDINGS & FINANCE S.A., Pully (CH)

(72) Inventor: Tim Bast, Sodra Sandby (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 63 days.

(21) Appl. No.: 16/980,953

(22) PCT Filed: Mar. 4, 2019

(86) PCT No.: PCT/EP2019/055327
§ 371 (c)(1),
(2) Date: Sep. 15, 2020

(87) PCT Pub. No.: WO2019/174951
PCT Pub. Date: Sep. 19, 2019

(65) Prior Publication Data
US 2020/0407092 A1    Dec. 31, 2020

(30) Foreign Application Priority Data

Mar. 16, 2018 (EP) .................................. 18162269

(51) Int. Cl.
*B65B 57/00* (2006.01)
*B65B 3/02* (2006.01)
(Continued)

(52) U.S. Cl.
CPC ................ *B65B 57/00* (2013.01); *B65B 3/02* (2013.01); *B65B 3/04* (2013.01); *B65B 41/00* (2013.01);
(Continued)

(58) Field of Classification Search
CPC .. B65B 57/00; B65B 3/02; B65B 3/04; B65B 41/00; B65B 61/26; G06F 3/0604;
(Continued)

(56) References Cited

U.S. PATENT DOCUMENTS 8,543,233 B2 *   9/2013  Donati ............. G05B 19/41865
                                                        700/96
11,292,241 B2 *  4/2022  Colson ..................... B65B 5/02
(Continued)

FOREIGN PATENT DOCUMENTS

| CN | 206757700 | 12/2017 |
| EP | 2075658 | 7/2009 |
| WO | WO 2017-114666 A1 | 7/2017 |

OTHER PUBLICATIONS

International Search Report in corresponding PCT Application No. PCT/EP2019/055327 dated May 15, 2019 (2 pages).

*Primary Examiner* — Anna K Kinsaul
*Assistant Examiner* — Luis G Del Valle
(74) *Attorney, Agent, or Firm* — Finnegan, Henderson, Farabow, Garrett & Dunner LLP

(57) ABSTRACT

The present invention provides a food packaging machine comprising a packaging material supply module, a food supply module, a filling module. The food packaging machine further comprises a hardware data processor operably connected to the packaging material supply module, operably connected to the food supply module, so operable to create a food data transaction, and operably connected to a network data processing system. The hardware data processor is operable to send the food data transaction to the network data processing system for the data transaction to be appended to a packaged food production data hash tree. The present invention further provides a system for packaging food comprising a plurality of food packaging machines as
(Continued)

Figure 1:
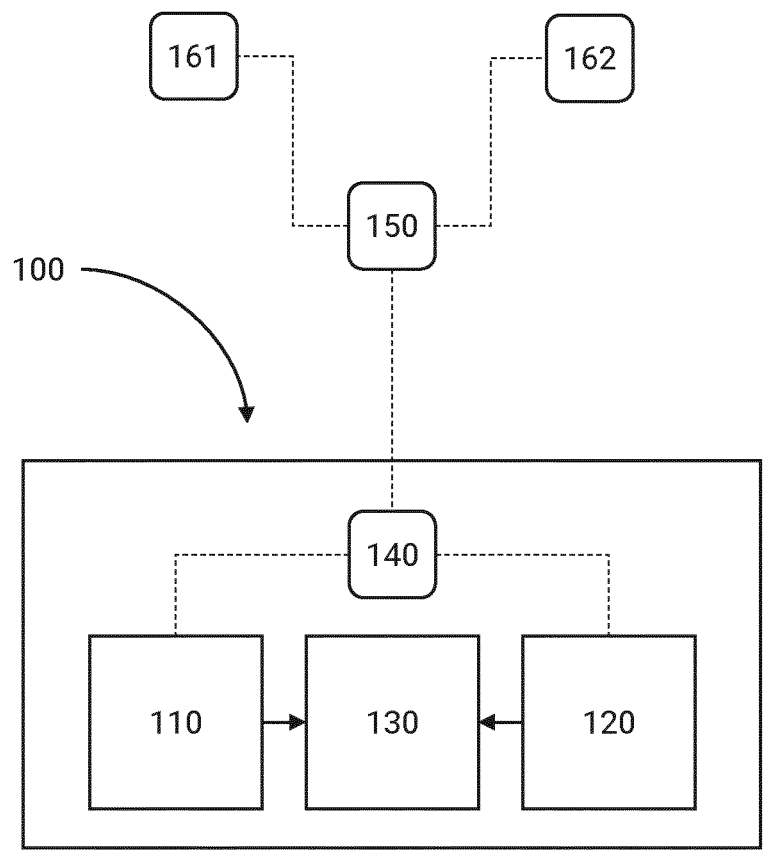

well as methods for tracking food data transactions in a food packaging machine and in a system for packaging food.

20 Claims, 10 Drawing Sheets

(51) Int. Cl.
 *B65B 3/04* (2006.01)
 *B65B 41/00* (2006.01)
 *B65B 61/26* (2006.01)
 *G06F 3/06* (2006.01)
(52) U.S. Cl.
 CPC ............ *B65B 61/26* (2013.01); *G06F 3/0604* (2013.01); *G06F 3/0655* (2013.01); *G06F 3/067* (2013.01)
(58) Field of Classification Search
 CPC ..... G06F 3/0655; G06F 3/067; H04L 9/3236; H04L 41/06; H04L 41/0622
 See application file for complete search history.

(56) References Cited

U.S. PATENT DOCUMENTS

| | | | |
|---|---|---|---|
| 2002/0184504 A1 | 12/2002 | Hughes | |
| 2004/0085561 A1* | 5/2004 | Fromherz | G06Q 10/06 700/99 |
| 2009/0271243 A1* | 10/2009 | Sholl | G06Q 10/06395 715/708 |
| 2011/0087720 A1* | 4/2011 | de Azambuja Turqueti | G05B 23/02 709/201 |
| 2014/0370167 A1* | 12/2014 | Garden | G06Q 50/12 99/325 |
| 2017/0101198 A1* | 4/2017 | Cherney | B65B 51/26 |
| 2017/0262862 A1 | 9/2017 | Aljawhari | |
| 2018/0096175 A1* | 4/2018 | Schmeling | G06F 1/3206 |
| 2018/0253468 A1* | 9/2018 | Gurajada | G06F 11/1474 |
| 2018/0285810 A1* | 10/2018 | Ramachandran | G06Q 10/087 |
| 2018/0321679 A1* | 11/2018 | Nixon | G08G 1/202 |
| 2019/0114581 A1* | 4/2019 | Vilag | G06Q 10/08 |
| 2020/0186332 A1* | 6/2020 | Moeller | H04L 9/30 |
| 2021/0334881 A1* | 10/2021 | Brannigan | G06Q 30/0635 |

* cited by examiner

FOOD PACKAGING MACHINE TRACKING FOOD SAFETY DATA USING HASH TREES

CROSS-REFERENCE TO RELATED PATENT APPLICATIONS

This is a National Phase of International Application No. PCT/EP2019/055327, filed Mar. 4, 2019, which claims the benefit of European Application No. 18162269.7 filed Mar. 16, 2018. The entire contents of the above-referenced applications are expressly incorporated herein by reference.

1 FIELD OF THE INVENTION

This invention relates to food packaging machines. More specifically, this invention relates to machines for packaging food which track food safety data.

2 BACKGROUND

Food safety is an increasingly important topic in the industrial production and packaging of food. In the event of a food safety incident, such as a compromised package or contaminated food content, it is vital to have quick access to all food safety relevant data at hand. The data should be as precise as possible rendering it possible to identify all other packages that are potentially affected by the same food safety incident. Finally, food safety relevant data should be tamper-proof in the sense that it should be quick and easy to validate whether a given data set is authentic or not.

In WO 2017/114666 A1, a method for quality control of a packaging system is disclosed. The method comprises receiving a record of packaging identification data, wherein the record of packaging identification data being related to a package. Next, identifying and receiving a record of machine data using said record of packaging identification data, wherein said record of machine data being related to a machine set up used when producing said package. Thereafter, identifying a packaging quality parameter to be checked based on said record of machine data, and requesting a record of packaging quality data related to said packaging quality parameter.

Tracking food safety data is different from tracking quality data. Food safety is applicable along the entire product lifecycle from the production of the food through packaging, transportation and sale of the packaged food, to the ultimate consumption of the food by consumer. Quality control of a packaging system is for all practical purposes relevant to the producer of the package. In contrast thereto, food safety data concerns all entities associated with any portion of the product lifecycle. This includes the farmer producing the food, entities processing or packaging the food, the distributors and sellers of the packaged food, and the consumer desiring to consume uncompromised safe food.

In US 2017/0262862 A1, a method for managing and providing provenance of a product using blockchain technology is described. There is disclosure of the association to the product of a unique product identifier as well as the optional association to the product of an anti-counterfeiting device also having a unique identifier as the product moves along the supply chain from its source phase, through the transformation phase and undergoes the transportation phase. There may be more than one product identifier or anti-counterfeiting device as the product is sometimes joined, sometimes partitioned and sometimes packaged. To manage and facilitate the generation and association of identifiers as the product moves along the supply chain there is a data memory device for storage of the unique identifier for the product and association by the server in the data memory device of the unique identifier for the product with the unique identifier of the anti-counterfeit device and other associations. The server is also adapted to receive and store in the data memory device one or more characteristics of the product existing or created as the product moves along the supply chain. Receipt by the processor of the unique identifier of a product or anti-counterfeit device with a query for the provenance of the product, makes available at least one characteristic associated with that product. The use of blockchain permits the creation of a block for each recorded characteristic and the retrieval of the record associated with a block and to verify that the recorded characteristic is the same as that retrieved from the block in the blockchain uniquely associated with the particular product.

It is an object of the present invention to overcome, at least partially, the technical problems faced by and provide improvements to the prior art machines and methods.

3 SUMMARY OF THE INVENTION

It is a specific object to provide a food packaging machine that allows for food safety relevant data to be collected, tracked, and recorded in a tamper-resilient and for all practical purposes tamper-proof way.

It is another specific object of the present invention to provide a food packaging machine that records tamper-resilient food safety relevant data in an efficient way that reduces the amount of data to be transmitted over network connections.

It is another specific object of the present invention to provide a food packaging machine that collects a set of food safety relevant data and combines the data in a food data transaction that is tamper-resilient and ready for being processed and recorded in an external device To solve any of these objects a food packaging machine according to Claim 1 is provided. Further improvements are provided in the food packaging machines according to Claims 1 to 10.

According to another aspect of the invention, any of the described objects is achieved with a method for tracking data in a food packaging machine according to Claim 15 and with the computer program according to Claim 16.

It is one specific object of the present invention to provide a system for packaging food that allows for food safety relevant data to be collected, tracked, and recorded in a tamper-resilient and for all practical purposes tamper-proof way.

It is another specific object of the present invention to provide a system for packaging food that records tamper-resilient food safety relevant data in an efficient way that reduces the amount of data to be transmitted over network connections.

It is another specific object of the present invention to provide a system for packaging food that collects a set of food safety relevant data and combines the data in a food data transaction that is tamper-resilient and ready for being processed and recorded in an external device To solve any of these objects a system for packaging food is provided. The system for packaging food comprises a plurality of food packaging machines according to Claim 11. Further improvements are provided in the systems for packaging food according to Claims 12 and 14.

According to another aspect of the invention, any of the described objects is achieved with a method for tracking data in a food packaging machine according to Claim 17 and with the computer program according to Claim 18.

Still other objectives, features, aspects and advantages of the invention will appear from the following detailed description as well as from the drawings

4 BRIEF DESCRIPTION OF THE FIGURES

In FIG. 1, an exemplary embodiment of a food packaging machine according to the present invention is shown.

Figure 2:
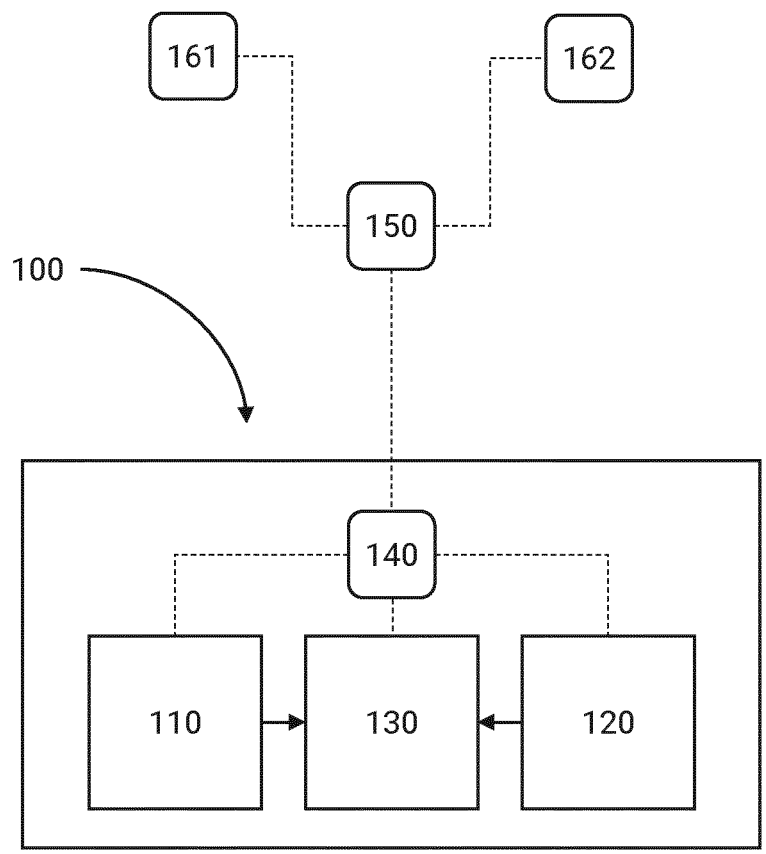

In FIG. 2, an exemplary embodiment of a food packaging machine according to the present invention is shown.

Figure 3:
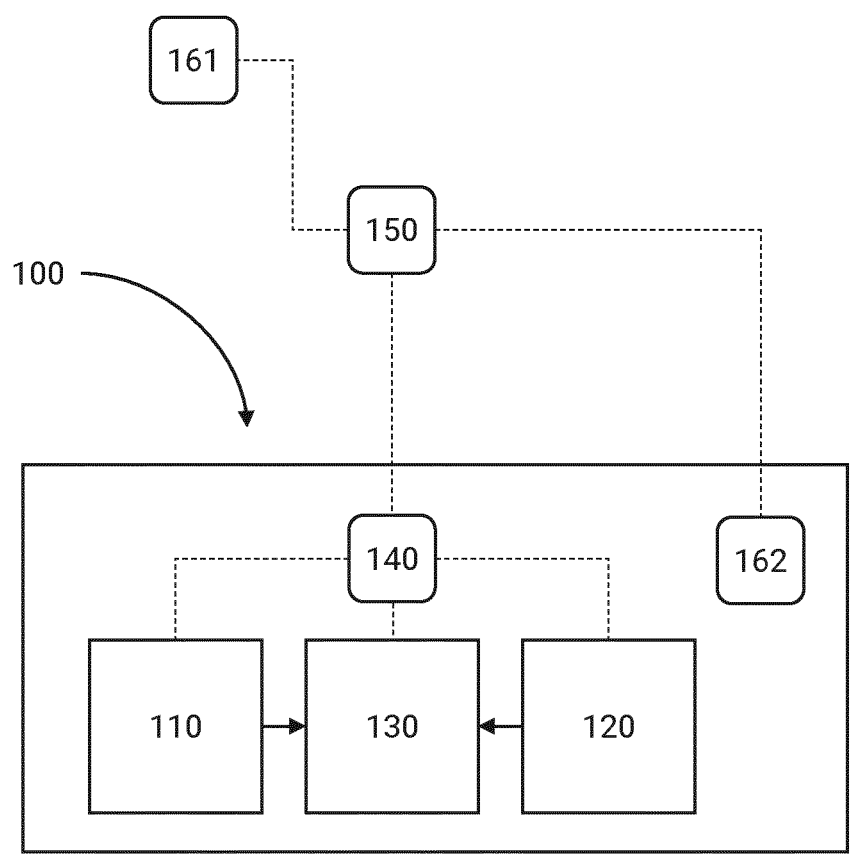

In FIG. 3, an exemplary embodiment of a food packaging machine according to the present invention is shown.

Figure 4:
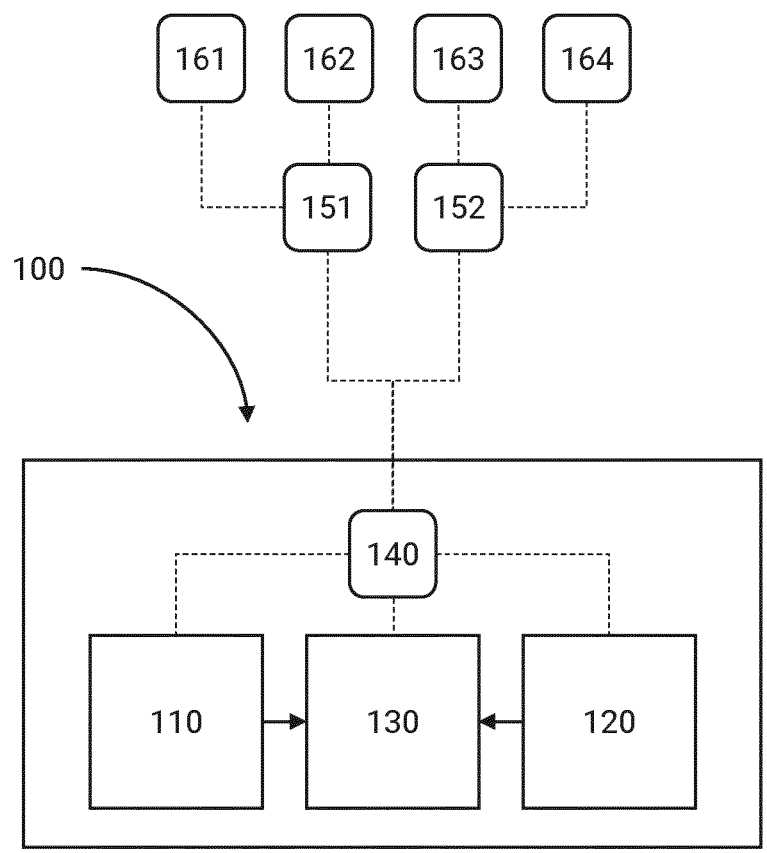

In FIG. 4, an exemplary embodiment of a food packaging machine according to the present invention is shown.

Figure 5:
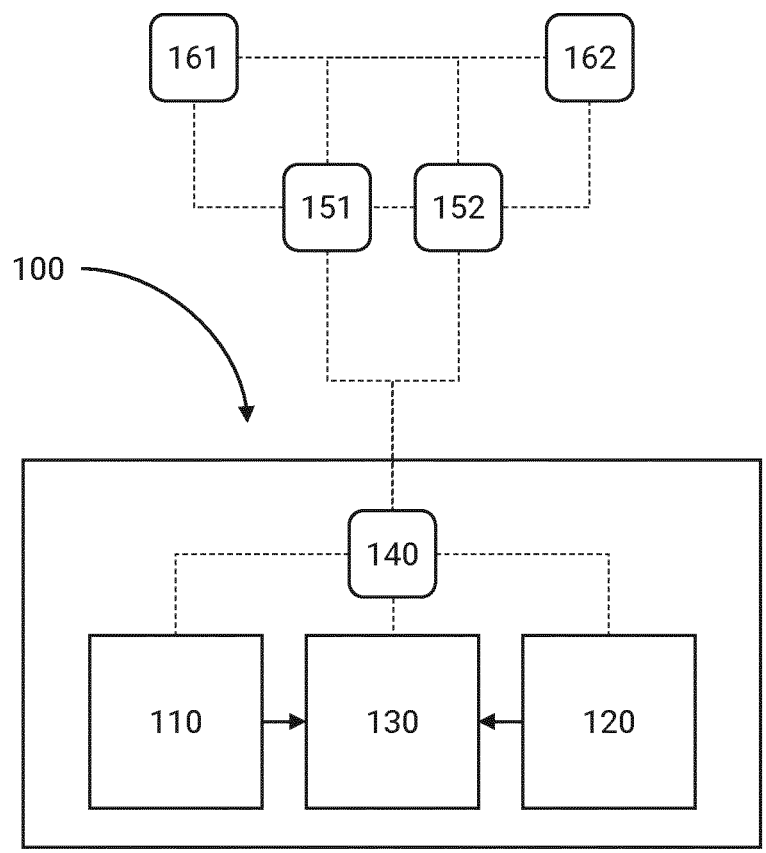

In FIG. 5, an exemplary embodiment of a food packaging machine according to the present invention is shown.

Figure 6:
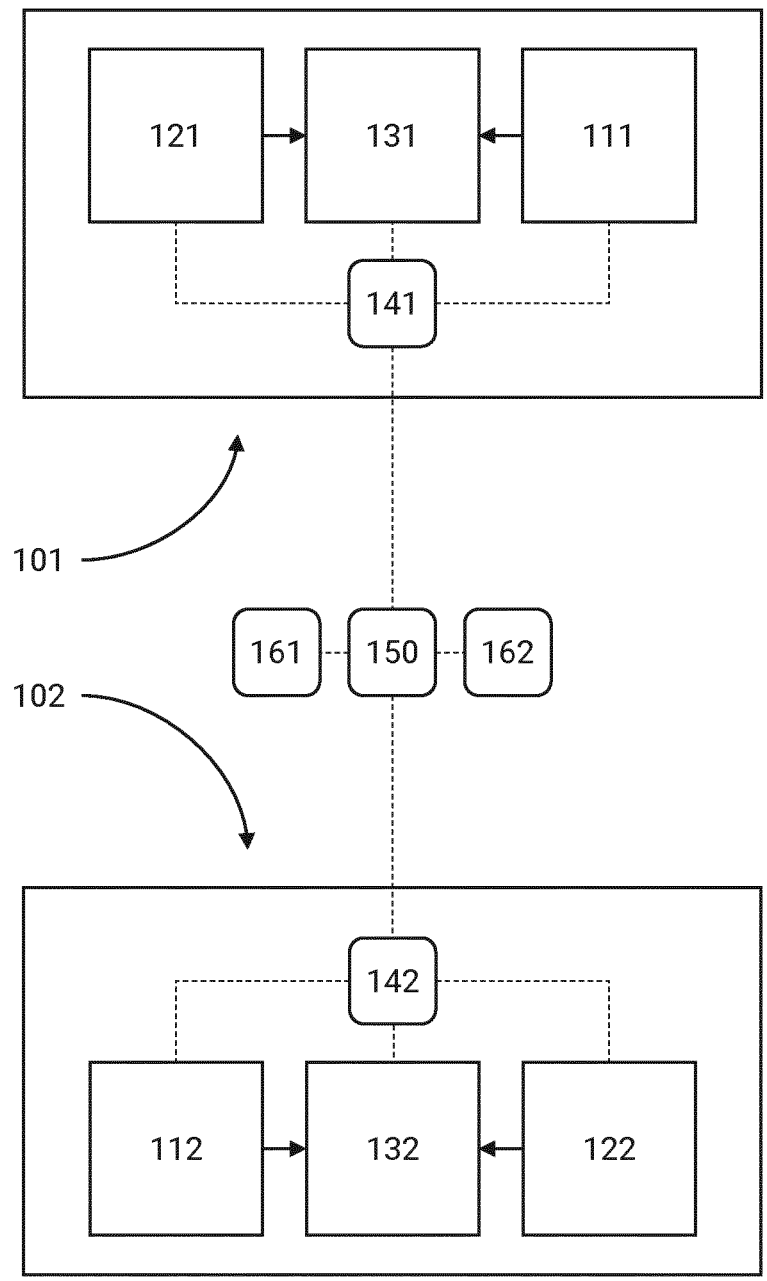

In FIG. 6, an exemplary embodiment of a system for packaging food comprising two food packaging machines according to the present invention is shown.

Figure 7:
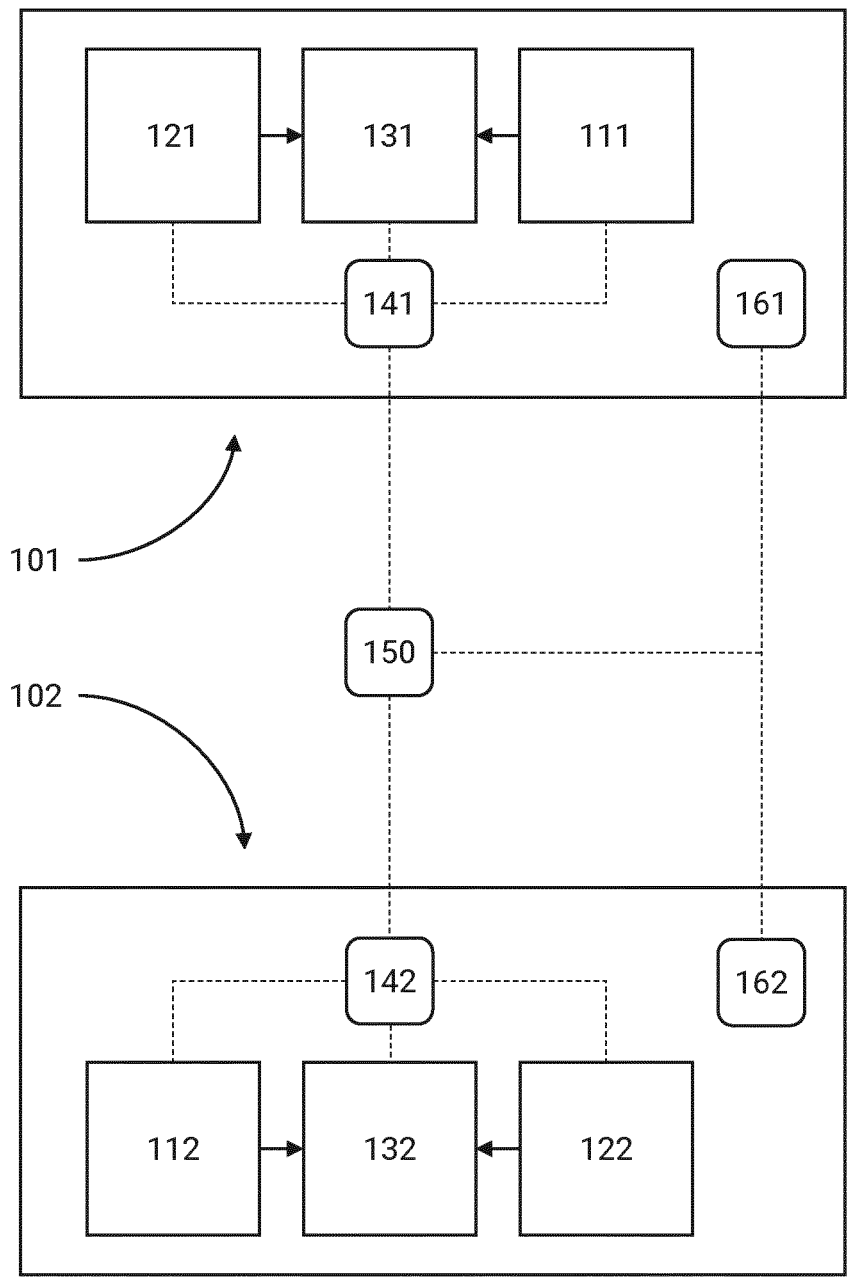

In FIG. 7, an exemplary embodiment of a system for packaging food comprising two food packaging machines according to the present invention is shown.

Figure 8:
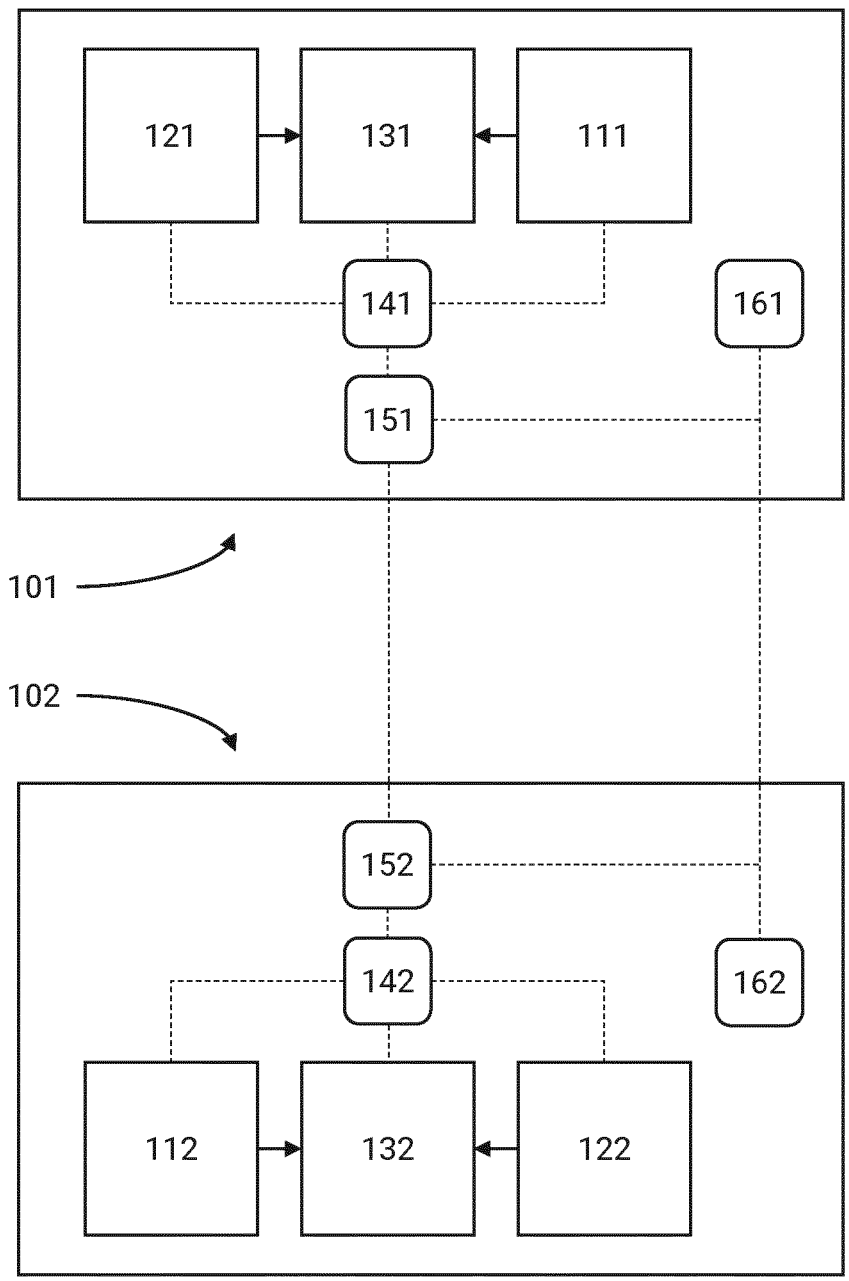

In FIG. 8, an exemplary embodiment of a system for packaging food comprising two food packaging machines according to the present invention is shown.

Figure 9:
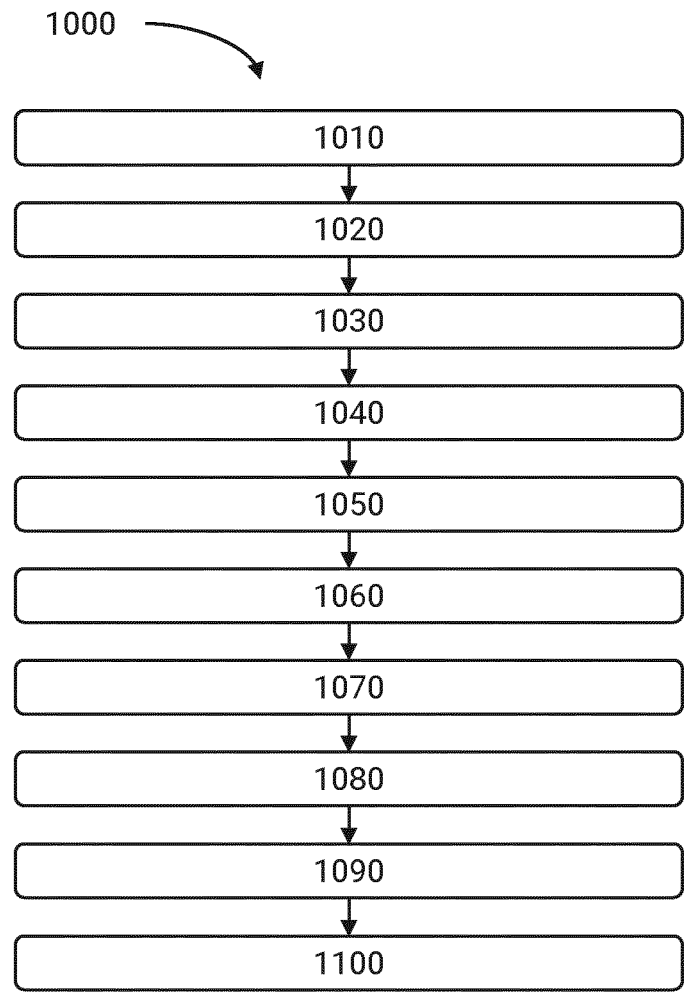
Figure 10:
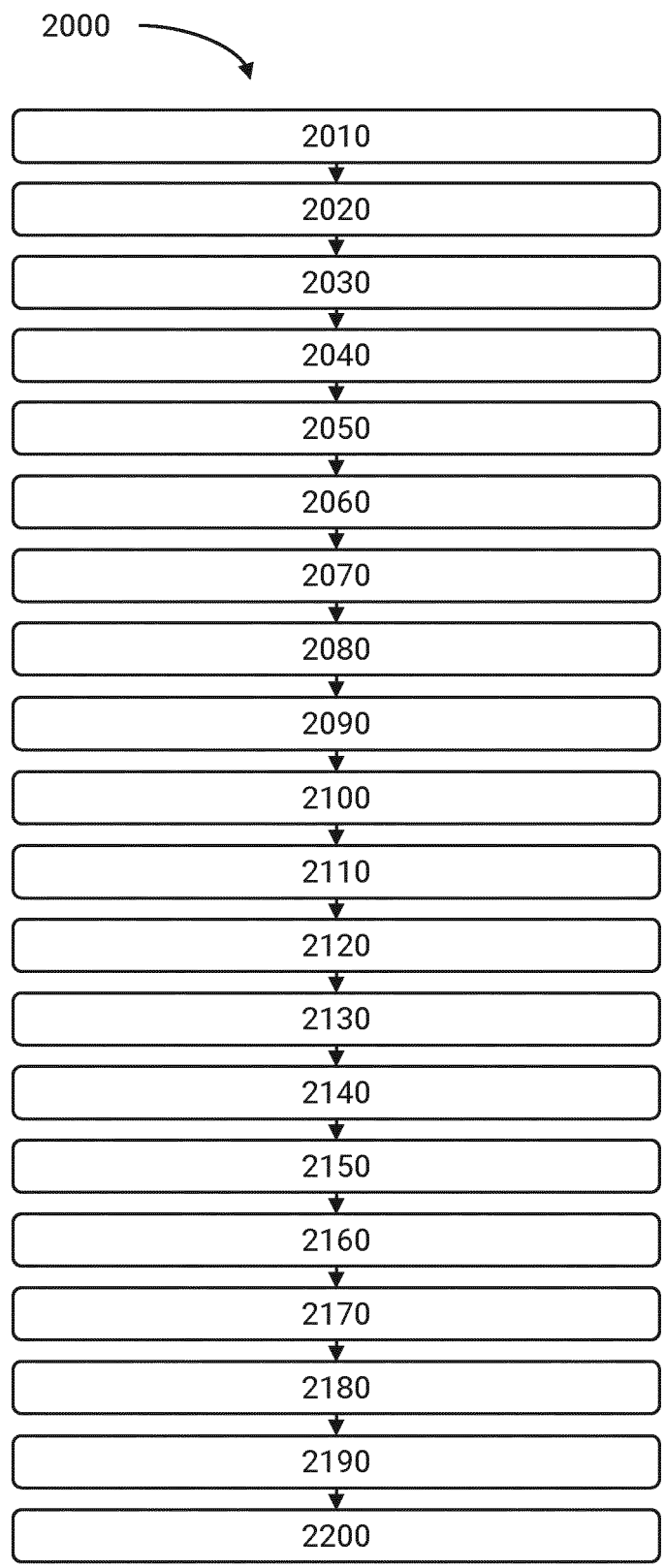

In FIG. 9, an exemplary embodiment of a method for tracking data in a food packaging machine according to the present invention is shown In FIG. 10, an exemplary embodiment of a method for tracking data in a system for packaging food comprising a first and a second food packaging machine according to the present invention is shown.

5 DETAILED DESCRIPTION

In one aspect, the present invention relates to food packaging machines.

The term "food" as used herein refers to any product that is intended for consumption by a human or an animal including without limitation edible food, beverages, and medicaments. Food can be raw or processed. The consumption maybe orally or through any other method delivering the product into the body of the consuming human or animal. The food may be liquid. The food may be a liquid containing particulates. The food may be viscous. The food may be solid.

The food packaging machine comprises a packaging material supply module. As used herein, the term "packaging material supply module" refers to any module of a food packaging machine that is operable to supply packaging material to the filling module. The packaging material can be supplied in various ways. The packaging material may be supplied as a continuous material such as a web material which is subsequently, either before or after filling, severed into pieces for forming individual containers. Alternatively, the packaging material may be supplied in the form of individual such as blanks from which one package or a group of packages can be formed. The packaging material can be supplied in the form of a ready-to-fill container such as a bottle. The packaging material can be supplied in the form of a preform that is subsequently transformed into the final package shape through a moulding process such as stretch-blow moulding.

As used herein, the term "packaging material" refers to any material or combination of materials that is suitable for containing food in a sealed package made from the packaging material. The packaging material may be suitable for protecting the food from undesirable interactions with the environment such as contamination, light exposure, or oxidization. Suitable packaging materials include without limitation paper, modified paper (such a grease paper), paper board, metal (such as aluminium), polymeric materials (such as polyethylene, polypropylene, polyesters, PET, polystyrene, polycarbonates), and glass. Suitable packaging materials further include without limitation combinations of the above-mentioned packaging materials such as laminated packaging materials comprising layers of any of the aforementioned materials. Laminated packaging materials may comprise a core layer of paper board. The core layer of the laminated packaging material may comprise cellulose fibres. Laminated packaging materials may comprise polymeric layers (such as polyethylene layers) on the inner and outer surfaces of the paper board to increase liquid imperviousness of the material. The laminated packaging material may further comprise an additional layer such as a metal foil layer to reduce oxygen transmission through the material. The additional layer may be positioned in between the inner surface of a paper board and an inner polymer layer.

The food packaging machine comprises a food supply module. As used herein, the term "food supply module" refers to any module of a food packaging machine that is operable to supply food to a filling module where the food is filled into the package. The food can be supplied in as a continuous flow of fluid or viscous product such as a beverage. The rate at which this continuous flow is controlled can be through a valve or a nozzle. The rate can be measure such as by measuring weight or volume with suitable sensors. Alternatively, the food can be provided in the form of discrete portions or items such as ice cream bars or confectionery.

The food packaging machine further comprises filling module. As used herein, the term "filling module" refers to any food packaging machine module that is operable to receive food from a food supply module, to receive packaging material from a packaging material supply module, to fill the received food into the packaging material, and to seal the package filled with the food. The seal may be intended not be opened until the consumer opens the package for consumption of the packaged food. An unbroken seal and package may thus indicate to the consumer that the package has been containing the food in uncompromised form since the packaging of the food. The filling module may be operable to form a formed package from the packaging material supplied by the package material supply module. Many different ways of forming a package are known in the art. The step of forming a package may be as simple as bringing the packaging material received from the packing material supply module into a position and orientation for being filled. Another way of forming a package is to form a tube by longitudinally sealing one longitudinal edge of a supplied web packaging material to the other longitudinal edge. The food, such as liquid food, may then be filled into the vertically arranged tube. Individual packages may then be formed by transversally sealing and cutting the tube. The individual packages may then be further formed by folding into the desired shape such as cuboid shaped packages. The forming step may further comprise folding over the flaps and attaching it to the main body of the package. Another way to form a package is to create a sleeve from packaging material which is then closed on one end, either the top or the bottom, to form a half-open blank. The food may then be filled into the half-open blank, after which the other end of the blank may be sealed to form a sealed package. The sleeve or the sealed package may be reformed through folding to bring the sealed package into the desired shape. Alternatively, the filling module may receive from the packaging material supply module a preformed package such as a preform and may transform the preform into a ready-to-fill package such as by stretch-blow moulding. The filling module may also receive from the packaging material supply a ready-to-fill package comprising a container, such as a bottle, having an opening to be filled. The opening of the ready-to-fill container may be the same opening through which the consumable food will be emptied from the final package or it may be a different opening which may be permanently sealed after filling the food into the package. The filling module may be operable to seal the filled package such as by sealing the packaging material. The filled package maybe hermetically sealed so that the packaged food cannot be accessed from the outside without opening the package. The sealing of filled container may be achieved by applying a reopenable closure such as a cap or by applying a non-reopenable closure such as a tear-off foil over the opening. The applied closure may comprise a tamper evidence feature. The filling module may be operable to output the sealed, formed, and filled package. The package may be output to further downstream equipment, such as downstream equipment for processing the packaged food (such as a retort or a pasteurizer) for packaging a plurality of sealed packages into a bundle wrapped by secondary packaging.

The food packaging machine may further comprise a food processing module. As used herein, the term "food processing module" refers to any module in the food packaging machine that affecting the composition, consistency, or state of the food. The food processing module may be arranged upstream of the food supply module, may be integrated with the food supply module, or may be arranged downstream of the filling module. Many food suitable food processing modules are known in the art including with limitation mixers, blenders with and without blades, filtration modules, heaters, coolers, curing tunnels, baking ovens, pasteurizers, retorts, and the like. The food processing module may comprise sensors for measuring operating parameters relevant for food safety. The food processing module may comprise storage means for saving the measured parameters.

The food packaging machine further comprises a hardware data processor. The term "hardware processor" or "hardware data processor" as used herein refers to electronic circuitry that is operable to carry out the instructions of a computer program. Such instructions include without limitation instruction to perform, on a basic level, arithmetic, logical, control and input/output (I/O) operations. The hardware processor may comprise a volatile or permanent memory for storing computer program instructions and for storing data. The hardware processor may comprise a microprocessor which incorporates the functions of a computer's central processing unit (CPU) on a single integrated circuit or at most a few integrated circuits. The microprocessor may be a multipurpose, clock driven, register based, digital-integrated circuit which accepts binary data as input, processes it according to instructions stored in its memory, and provides results as output. Microprocessors contain both combinational logic and sequential digital logic. Microprocessors operate on numbers and symbols represented in the binary numeral system. The hardware processor may be configured to be connected to a data bus for exchanging data with other hardware processors or other storage devices. Such connection may be wired or wireless. The terms "hardware processor" and "hardware data processor" are used interchangeably in the present disclosure.

The hardware processor of the food packaging machine is operably connected to the packaging material supply module to receive a packaging material data package record indicative of the packaging material batch currently supplied to the filling module. The packaging material supply module may comprise a hardware processor which is operably connected to a sensor which is sensing a property of the packaging material currently supplied by the packaging material supply module to the filling module. The sensor may be sensor configured for reading a one-dimension optical code (such as a barcode) or a two-dimensional optical code (such as a QR code) from the outer surface of the packaging material. The hardware processor may be connected to a user input terminal where the operator can input information identifying the packaging material currently supplied by the packaging material supply module to the filling module. The hardware processor may be configured to create a packaging material data record which includes information indicative of the packaging material batch currently supplied to the filling module. The hardware processor may further be configured to append further information to the packaging material data record including without limitation a time stamp, location information, a unique identifier of the packaging material supply module such as a digital signature, additional information relating to any of the components of the packaging material, other information relating to the current status of the packaging material supply module such as temperature, humidity, time of continuous operation, aseptic status, current running speed, operator identity, or other operational parameters. Such information may be retrieved by the hardware processor from a connected memory, from a user input terminal, or from other data sources to which the hardware processor is connected through a data network. The operable connection between the hardware processor and the packaging material supply module may be direct or indirect. An indirect connection may be achieved by operably connecting the packaging material supply module with the filling module and the filling module with the hardware processor.

The hardware processor of the food packaging machine is operably connected to the food supply module to receive a food data record indicative of the food batch currently supplied to the filling module. The food supply module may comprise a hardware processor which is operably connected to a sensor which is sensing a property of the food batch currently supplied by the food supply module to the filling module. The sensor may be a sensor configured for reading a one-dimension optical code (such barcode) or a two-dimensional optical code (such as QR code) from the outer surface of the container in which the food was supplied to the food supply module. The hardware processor may be connected to a user input terminal where the operator can input information identifying the food batch currently supplied by the food supply module to the filling module. The hardware processor may be configured to create a food data record which includes information indicative of the food batch currently supplied to the filling module. The hardware processor may further be configured to append further information to the food data record including without limitation a time stamp, location information, a unique identifier of the food supply module such as a digital signature, additional information relating to any of the ingredients of the food batch (such as time and place of production, time and mode of transportation from the place of origin), other information relating to the current status of the food supply module such as temperature, humidity, time of continuous operation, aseptic status, current running speed, operator identity, or other operational parameters. Such information may be retrieved by the hardware processor from a connected memory, from a user input terminal, or from other data sources to which the hardware processor is connected through a data network. The operable connection between the hardware processor and the food supply module may be direct or indirect. An indirect connection may be achieved by operably connecting the food supply module with the filling module and the filling module with the hardware processor.

The hardware processor of the food packaging machine may be operably connected to the filling module to receive a filling data record indicative of at least one operational parameter of the filling module. Suitable parameters include without limitation a unique identifier for the filling module, temperature, aseptic status, speed of operation, location of the filling module, time and date of current operation, elapsed time of operation since last start-up, number of packages produced since last start-up, and volume or weight of food packaged since last start-up. The filling data record may comprise part or all of either of the packaging material data record or the food data record or of both data records.

The hardware processor of the food packaging machine may be operably connected to a food processing module comprised in the food packaging machine. The hardware processor may receive a food processing data record indicative of at least one operational parameter of the filling module. Suitable parameters include without limitation a unique identifier for the food processing module, temperature, aseptic status, speed of operation, location of the food processing module, time and date of current operation, elapsed time of operation since last start-up, and volume or weight of food processed since last start-up.

The hardware processor of the food packaging machine is operable to create a food data transaction relating to a time stamp identifying the time at which the filling module filled the supplied food into the formed package, a machine data record identifying the filling module or the food packaging machine, all or part of the packaging material data record, and all or part of the food data record. The food data record may further relate to all or part of the optional filling data record. Alternatively, the hardware processor of the food packaging machine is operable to create a food data transaction comprising a plurality of food data records wherein each such data record comprises the above data.

As used herein, the term "food data transaction" refers to data derived from data comprising all or part of the food data record and all or part of the packaging material data record. The food data transaction may be derived from data comprising all or part of a plurality of corresponding pairs of food data record and the packaging material data record. The food data transaction may comprise data derived from a food processing data record. The food data transaction may be digitally signed by the hardware processor creating it. The data from which the food data transaction is derived may further comprise data relating to an earlier food data transaction created on the same food packaging machine. The data from which the food data transaction is derived may further comprise data received from an external entity such as a network data processing system. The digital signature verifies the data content of the data transaction in its entirety. The digital signature may be effected by a creating a cryptographic hash value of all or part of the data records. The digital signature may further be effected by a creating a cryptographic hash value of each individual food data record within the transaction all or part of the food data records and then creating a cryptographic hash value of the combination of one, some, or all of the cryptographic hash values of the individual data records. The food data transaction may take the form of a hash tree of the individual food data records. The food data transaction may consist of the top hash value of the hash tree created from the individual food data records.

As used herein, the term "hash tree" refers to a data structure in the form of a tree in which every node except the initial nodes has one or more predecessor nodes and is labelled with the cryptographic hash of the labels of one, more than one, or all predecessor nodes. Hash trees with many nodes having more than one predecessor node (such as for example Merkle trees) allow efficient and secure verification of the contents of large data structures. The hash tree may comprise a top node which has been derived by creating one or more generations of hash values of the initial nodes (data nodes). The top node of a hash tree is the only node which has not been subjected to the creation of a further hash value. The hash tree may be a hash list in which one node (the top hash) is labelled with the cryptographic hash of the labels of all other nodes (the list of hashes). The hash tree may be a hash chain in which each node has exactly one predecessor node and is labelled with the cryptographic hash of the label of its predecessor node. Preferably, the hash tree is secure in accordance with the Secure Hash Standard (SHS) issued by the Information Technology Laboratory of National Institute of Standards and Technology (U.S. Department of Commerce, FIPS PUB 180-4, August 2015) available at http://dx.doi.org/10.6028/NIST.FIPS.180-4.

As used herein, the term "hash function", refers to any function that can be used to map data of arbitrary size ("message") to data of fixed size ("value"). The values returned by a hash function are called hash values, or just hashes.

As used herein, the term "cryptographic hash" as used herein refers to a hash returned by a cryptographic hash function. As used herein, the term "cryptographic hash function" refers to a special class of hash functions which is configured to be difficult to invert. A cryptographic hash function may be deterministic so the same message always results in the same hash. A cryptographic hash function may be configured to allow for quick computation of the hash value for any given message. A cryptographic hash function may be configured such that it is practically infeasible to generate a message from its hash value except by trying all possible messages. A cryptographic hash function may be configured such that a small change to a message should change the hash value so extensively that the new hash value appears uncorrelated with the old hash value. A cryptographic hash function may be configured such that it is practically infeasible to find two different messages with the same hash value. A variety of suitable cryptographic hash functions is known in the art including without limitation MD5, SHA-0, SHA-1, SHA-2 (including variants), SHA-3 (including variants), SHAKE128, SHAKE 256, BLAKE, BLAKE2, and sponge functions (including the Keccak sponge functions).

The food packaging machine may comprise a local storage device for storing food data records. The local storage device may be operably connected to the hardware data processor of the food packaging machine. In cases where a data transaction does not comprise the full data of the food data records it relates to, then it is possible to obtain the underlying data from local storage device and to verify accuracy by recreating the food data transaction and comparing it with the earlier food data transaction such as by comparing their hash values. The local storage device may form part of the food packaging machine or may be located at a separate location connected to the food packaging machine through a wired or wireless network connection.

The hardware processor of the food packaging machine is operably connected to a network data processing system. As used herein, "network data processing system" refers to a data processing system comprising a hardware processor that is operable to send data to and to receive data from other entities comprising a hardware processor through a network connection established between the network data processing system and the other entity. As used herein, the term "network connection" refers to a connection between to separate entities, each comprising a hardware processor, over which data, such as digital data, can be sent and received. The network connection maybe be a wired connection (such as a wide area network based on the Ethernet protocol), a wireless network connection (such as a wireless area network) or a combination of wired and wireless. The network data processing system is physically separate from any entity to which it is connected through a network connection and is preferably located at a separate location from at least one of the connected entities.

The network data processing system is operably connected to a plurality of separate network storage devices for storing decentral instances of a data hash tree. As used herein, the term "network storage device" refers to a data processing system comprising a hardware processor and a permanent memory for storing information. The network storage device is operable to receive data through a network connection from another entity comprising a hardware processor such as a network data processing system. The network storage device may be operable to read data from its permanent memory and to send such data through a network connector to another entity such as a network data processing system or a network storage device. The network storage device is physically separate from any entity to which it is connected through a network of data connections and is preferably located at a separate location from at least one of the connected entities.

The network data processing system is operable to read from one of the network storage devices a packaged food production data hash tree.

As used herein, the term "packaged food production data hash tree" refers to a hash tree which comprises data transactions which relate to the production of packaged food. The packaged food production data hash tree may comprise a plurality of individual data transactions each relating to food data records in which the individual data transactions have been created on a plurality of food packaging machines. The packaged food production data hash tree may comprise a first plurality of individual data transactions each relating to food data records created by the hardware processor of a first food packaging machine together with a second plurality of individual data transactions each relating to food data records created by the hardware processor of a second food packaging machine whereby the first and second food packaging machines may be located in the same plant or at different plants at separate locations.

The packaged food production data hash tree may have the form of hash tree in which the food data transactions received by the network processing system form the initial nodes. The network processing system may create a hash value of the received food data transactions, optionally of the received food data transaction in conjunction with a time stamp of the time of receipt by the network processing system or a unique identifier of the network processing system or in conjunction with both. The packaged food production data hash tree may comprise nodes which relate to a subset of the received food data transaction such as for those food data transactions received during a certain time interval or for those received from the same food packaging machine. Such nodes may be created by computing a hash value of the accumulated food data transactions. The packaged food production data hash tree may comprise further nodes which are created by computing a hash value relating to the cumulative subset of nodes which relate to a subset of food data transactions. The food data transaction has tree may comprise a top node. A new top node of the food data transaction hash tree may be obtained by computing a hash value relating to previous top node and to the cumulative food data transactions received since the creation of the previous top node. The food data transaction hash tree may comprise a time sequence of top hash nodes in the form of a hash list in which the latest top node is labelled with the hash values of one or more previous top nodes.

The network data processing system may further be operable to read from a second network storage device, and optionally from further network storage devices, a packaged food production data hash tree. The network data processing system may be operable to compare a first packaged food production data hash tree received from a first network data storage device with a second packaged food production data hash tree received from a second network data storage device. Such comparison may be carried out by comparing the cryptographic hashed of the received packaged food production data hash trees. The network data processing system may be operable to output a warning in case it determines that the first packaged food production data hash tree is not identical with the second packaged food production data hash tree.

The network data processing system may be able to initialize packaged food production data hash tree in case no previously existing packaged food production data hash tree has been stored on the network storage device.

The network data processing system is operable to append a received food data transaction to the packaged food production data hash tree of data. The food data transaction may be appended to the food production data hash tree in accordance with the predefined format of the food production data hash tree. The step of appending a food data transaction to the food production data hash tree may comprise the step of creating a hash value of the received food data transactions, optionally of the received food data transaction in conjunction with a time stamp of the time of receipt by the network processing system or a unique identifier of the network processing system or in conjunction with both. The step of appending a food data transaction to the food production data hash tree may comprise the step of creating a hash value of the received food data transactions, and storing the hash value of the received food data transaction together with a time stamp of the time of receipt by the network processing system in a local storage device associated with the network processing system. For verifying the food data records of a certain food packaging machine, it is thus possible to compare the hash values of the food data transactions received from that machine with the locally saved values and to recreate the entire or a portion of the food production data hash tree to compare with the previously saved version.

The network data processing system may be operable to send to the hardware processor of the connected food packaging machine a data record derived from the data currently present in the network data processing system. Such data may be included by the hardware processor in the food packaging machine when creating the subsequent food data transaction. The data record sent to each food packaging machine operably connected with the network data processing system may be identical or different. The data record sent to a first food packaging machine may be derived from data comprising data relating to at least one other food packaging machine, preferably a plurality of or all other operably connected food packaging machines.

The network data processing unit system is operable to cause decentralised storage of decentralised identical instances of the appended packaged food production data hash tree of data in the plurality of network storage devices. The plurality of network storage devices may be located at different locations, preferably each network storage device at a different location. Keeping the network storage devices at different locations renders it very unlikely that all network storage devices are physically destroyed at the same time or by the same incident. the network storage devices at different location may further allow the network storage devices to be access controlled (physically and electronically) by separate independent entities making it hard to gain control over all the network storage devices in an attempt to tamper with the packaged food production data hash tree. To verify that the uncompromised packaged food production data hash tree, the packaged food production data hash trees saved on all network storage devices may be compared. The verification may be achieved by comparing hash values comprised in the nodes of the tree.

The hardware processor of the food packing machine is operable to send the food data transaction to the network data processing system for the food data transaction to be appended to the data hash tree. The sending of the food data transaction may be effected at periodic time intervals or alternatively may be effected at irregular or randomly chosen time intervals. The sending of the food data transaction may be triggered by external signals such as signals send from a network data processing system.

The hardware processor of the food packing machine is operable to receive the appended packaged food production data hash tree from the network data processing system, wherein the appended packaged food production data hash tree comprises the food data transaction appended by the network data processing system to the packaged food production data hash tree. The packaged food production data hash tree may be obtained by the network data processing system from at least one of the plurality of network storage devices.

In FIG. 1, an exemplary embodiment of a food packaging machine according to the present invention is shown. The food packaging machine 100 comprises a packaging material supply module 110, a food supply module 120, and a filling module 130. The food packaging machine further comprises a hardware data processor 140 which is operably connected to the packaging material supply module 110 and the food supply module 120. The hardware data processor 140 is operably connected to a network data processing system 150. The network data processing system 150 is further connected to a plurality of separate network storage devices 161 and 162.

In another aspect, the present invention provides a food packaging machine wherein the hardware data processor may be further operably connected to the filling module to receive a filling data record indicative of at least one operational parameter of the filling module.

In FIG. 2, an exemplary embodiment of a food packaging machine according to the present invention is shown. The food packaging machine 100 comprises a packaging material supply module 110, a food supply module 120, and a filling module 130. The food packaging machine further comprises a hardware data processor 140 which is operably connected to the packaging material supply module 110, the food supply module 120, and to filling module 130. The hardware data processor 140 is operably connected to a network data processing system 150. The network data processing system 150 is further connected to a plurality of separate network storage devices 161 and 162.

In another aspect, the present invention provides a food packaging machine wherein the food packaging machine further comprises one of the network storage devices. When the network storage device is arranged locally, it is possible advantage to access the packaged food production data hash tree. Another possible advantage is that the network storage devices can be governed by the same physical and electronic access restriction as the food packaging machine and the hardware data processor.

In FIG. 3, an exemplary embodiment of a food packaging machine according to the present invention is shown. The food packaging machine 100 comprises a packaging material supply module 110, a food supply module 120, and a filling module 130. The food packaging machine further comprises a hardware data processor 140 which is operably connected to the packaging material supply module 110, the food supply module 120, and to filling module 130. The hardware data processor 140 is operably connected to a network data processing system 150. The network data processing system 150 is further connected to a plurality of separate network storage devices 161 and 162. The food packaging machine 100 comprises the network storage 162.

In another aspect, the present invention provides a food packaging machine wherein the hardware data processor may be further operably connected to a second network data processing system separate from the first network data processing system. Providing a second network data processing system allows to process data sent by the hardware data processor at least two different location and potentially independent of each other. The redundancy can be used to avoid a system failure in case one of the network data processing systems fails or is unavailable. The redundancy can be used to provided workload balancing between the network data processing systems. Network data processing systems can be used in a predetermined sequence or random sequence determined ad-hoc by an external entity or one of the network data processing systems.

The second network data processing system may be operably connected to the plurality of network storage devices. This configuration allows for the decentralized storage of the data produced by the second network data processing system.

The second network data processing unit each may be operable to read from one of the network storage devices a second packaged food production data hash tree. The second network data processing unit each may be operable to append blocks of received data transactions to the second packaged food production data hash tree. The second network data processing unit each may be operable to cause decentralised storage of identical instances of the first and second packaged food production data hash trees are stored in the network storage devices.

It is further possible to have the at least two network data processing systems perform the same processing of the data provided by the hardware data processor of the food packaging machine so that the results can be compared. The comparison of the resulting data allows to identify whether one network data processing system has been compromised. Being able to identify compromised data is relevant for rendering food safety data tamper-proof. Having more than one, preferably a large number of, network data processing systems would require an attacker to gain control over all of the systems in order to modify all data. An attack could be identified as soon as the data produced by one network data processing system deviates from the data produced by another network data processing system.

In FIG. 4, an exemplary embodiment of a food packaging machine according to the present invention is shown. The food packaging machine 100 comprises a packaging material supply module 110, a food supply module 120, and a filling module 130. The food packaging machine further comprises a hardware data processor 140 which is operably connected to the packaging material supply module 110, the food supply module 120, and to filling module 130. The hardware data processor 140 is operably connected to a first network data processing system 151 and to a second network data processing system 152. The first network data processing systems 151 is further connected to a plurality of separate network storage devices 161 and 162. The second network data processing systems 152 is further connected to a plurality of separate network storage devices 163 and 164.

In FIG. 5, an exemplary embodiment of a food packaging machine according to the present invention is shown. The food packaging machine 100 comprises a packaging material supply module 110, a food supply module 120, and a filling module 130. The food packaging machine further comprises a hardware data processor 140 which is operably connected to the packaging material supply module 110, the food supply module 120, and to filling module 130. The hardware data processor 140 is operably connected to a first network data processing system 151 and to a second network data processing system 152. Each of the network data processing systems 151 and 152 is further connected to a plurality of separate network storage devices 161 and 162.

In another aspect, the present invention provides a food packaging machine wherein the hardware data processor may be further operably connected to a second network data processing system separate from the first network data processing unit. The first and the second network data processing unit may be operably connected to the plurality of network storage devices. The first network data processing system and the second data processing unit system may each be operable according to a joint consensus mechanism to append blocks of received data transactions to the packaged food production data hash tree and to store identical instances of the appended data hash tree decentrally in the network storage devices. As used herein, the term "joint consensus mechanism" refers to a mechanism able to ensure with the defined level of certainty that the appended hash tree created by each of the first and the second network data processing devices is identical, confirms to the predetermined rules of the hash tree, and that this appended hash tree is then sent to and saved in the network storage devices.

The defined level of certainty of the joint consensus mechanism may comprise a defined level of safety which may be defined by a defined portion of the network data processing systems computing identical hash trees. Each network data processing system may operable to append the hash tree such the appended hash tree comprises information identifying the other participating network data processing systems which have computed an identical appended hash tree.

The defined level of certainty of the joint consensus mechanism may comprise a defined level of liveness which may be defined by a defined portion of the network data processing systems having eventually computed an appended hash tree. Each network data processing system may operable to append the hash tree such the appended hash tree comprises information identifying the other participating network data processing systems which have computed an appended hash tree after a predefined amount of time.

The defined level of certainty of the joint consensus mechanism may comprise a defined level of fault tolerance. The defined level of fault tolerance may comprise a defined level of fault tolerance for non-participating network data processing systems. These non-participating may have stopped functioning or the communication between the affected system has been interrupted. The defined level of fault tolerance may comprise a defined level of fault tolerance for Byzantine faults where the participating network data processing system provides an appended hash tree that is erratically deviating from the expected appended hash tree.

A number of suitable consensus mechanism are known in the art which are based on hardware processors carrying out dedicated instruction sets including without limitation Proof-of-Work, Proof-of State, Proof-of-Elapsed Time, Practical Byzantine Fault Tolerance, SIEVE, Cross-Fault Tolerance (XFT), Federated Byzantine Agreement (such as Ripple Consensus Protocol Algorithm and Stellar Consensus Protocol), and the Swirlds Hashgraph Consensus Algorithm.

In another aspect, the present invention provides a food packaging machine wherein the packaged food production data hash tree may be a distributed ledger. As used herein, the term "distributed ledger" refers to a packaged food production data hash tree that is shared, replicated, and synchronized among the network storage devices. The distributed ledger records the food data transactions among the network storage devices. The one or more network data processing means may govern and agree by consensus on the updates to the records in the packaged food production data hash tree. Every record in the distributed packaged food production data hash tree may have a timestamp and unique cryptographic signature, thus making the ledger an auditable history of all food data transactions in the network. One among many suitable implementations of distributed ledger technology known in the art is the open source Hyperledger Fabric blockchain.

In another aspect, the present invention provides a food packaging machine wherein the data hash tree is a blockchain. As used herein, the term "blockchain" refers to a packaged food production data hash tree that is shared, replicated, and synchronized among the network storage devices and which comprises blocks of data. Each block of data comprises at least a first food data transaction from a first food packaging machine and a second food data transaction from a second food packaging machine. Each block as a whole may include a cryptographic hash of its entire data content. By mixing data from more than one food packaging machine, preferably from a large number of food packaging machines, creating a cryptographic hash of the cumulative data increases the difficulty to alter the packaged food production data hash tree retroactively. The blockchain used for the present invention may be a public blockchain where any party can set up a network data processing system or a network data storage system and participate in maintaining and governing the packaged food production data hash tree. The blockchain used for the present invention may be a private blockchain where the parties who can run a network data processing system or a network data storage system and participate in maintaining and governing the packaged food production data hash tree are centrally determines. One advantage of a private blockchain is that the identity of each party participating in the blockchain can be verified prior to granting access to the blockchain and that the compliance of each participant can be tracked.

In another aspect, the present invention provides a food packaging machine wherein the packaged food production data hash tree is a semi-public blockchain. As used herein, the term "semi-public blockchain" refers to a blockchain in which permission to participate in the blockchain by running a network data processing system or a network data storage system are granted access based on pre-defined criteria. To maintain the integrity of the packaged food production data hash tree, it is desirable to allow a large number of participants in the blockchain to render it harder to modify the packaged food production data hash tree with malicious intent. Food packaging machines generally do not operate continuously, but need to be shut down in regular intervals for cleaning or maintenance. Food packaging machines sometime undergo unscheduled stops when machine parts fail. In a semi-public blockchain, it may be possible to join as participant as well as to terminate participation while the blockchain is running. One advantage of a semi-private blockchain is that the identity of each party participating in the blockchain can be verified prior to granting access to the blockchain and that the compliance of each participant can be tracked. In the semi-private blockchain of the present invention, the implementation of the blockchain may be controlled by one entity such as by setting the rules of governance and participation and by granting the right to participate to other entities. In the semi-private blockchain of the present invention, the number and identities of the blockchain participants may be tracked for each block of the blockchain.

In another aspect, the present invention provides a food packaging machine wherein the food data package to be received by the hardware data processor unit comprises a transaction stored in the food production data hash tree and the machine data processing unit is operable to verify the food data package with the food production data hash tree hash tree before creating the food data transaction. To keep the data content of the food production data hash tree as complete and traceable as possible, it is advantageous that the hash tree further comprises data transactions relating to the food safety relevant events from the food product lifecycle of the food filled into the package by the food packaging machine. As used herein, the term "data transactions relating to the food safety relevant events" refers to any data transaction that comprises data from any event from the first production of any component of the food to the filling of food into the package in the food packaging machine. Such data include, origin of the food component, time and location of the harvesting or production, time, location and environmental conditions such as temperature and humidity while the food is stored or transported, identities of operators or entities being in control of the food component, processing steps and machines to which the food components has been exposed, and the like.

In another aspect, the present invention provides a food packaging machine wherein the material data package to be received by the machine data processing unit comprises a transaction stored in the packaged food production hash tree and the machine data processing unit is operable to verify the material data package with the packaged food production hash tree before creating the data transaction. To keep the data content of the food production data hash tree as complete and traceable as possible, it is advantageous that the hash tree further comprises data transactions relating to the food safety relevant events from the lifecycle of the packaging material used to manufacture the package into which the food filled by the food packaging machine. As used herein, the term "data transactions relating to the food safety relevant events" refers to any data transaction that comprises data from any event from the first production of any component of the packaging material to the filling of food into the package in the food packaging machine. Such data include, origin of the packaging material component, time and location of the harvesting or production, time, location and environmental conditions such as temperature and humidity while the packaging material component is stored or transported, identities of operators or entities being in control of the packaging material component, processing steps and machines to which the packaging components has been exposed such as the final lamination process when producing a laminated packaging material, and the like.

In another aspect, the present invention provides a system for packaging food comprising a plurality of food packaging machines. The machine hardware data processor unit of each food packaging machine may be operably connected to the network data processing system. The network data processing system may be operably connected to a plurality of network storage devices. In the setup with at least, preferably at least 10, more preferably at least 100, food packaging machines, the hardware processors (e.g. hardware data processors) of which are connected to the same network processing device, it is possible for the network data processing to create a packaged food production hash tree comprising data transactions being received from each of the connected food packaging machines. These data transaction may be intertwined with each other such as by including a hash value of at least two combined data transactions, each being received from a different food packaging machine. The network data processing system may be located at a site different from the sites where the food packaging machines are located. The access protection to the network data processing system may be different and potentially more stringent than the access protection applied at each of the food packaging machines including the network storage devices comprised in them. It is thus possible for one entity to control the creation of the packaged food production hash tree because the set of instructions for creating the hash tree only needs to be stored in the network data processing system which carries out the instruction. The set of instruction can thus be kept secret from the operators of the food packing machines. While creating the packaged food production hash tree, the network data processing system may create a series of random numbers which are integrated into the packaged food production hash tree and thus form part of the hash values in the hash tree. Without knowledge of these series of random numbers, the packaged food production hash tree can thus not be recreated. For retroactively modifying the packaged food production hash tree, access to the series of random numbers which could also be kept secret away from the packaged food production hash tree would be required.

In FIG. 6, an exemplary embodiment of a system for packaging food comprising two food packaging machines according to the present invention is shown. The first food packaging machine 101 comprises a packaging material supply module 111, a food supply module 121, and a filling module 131. The food packaging machine further comprises a hardware data processor 141 which is operably connected to the packaging material supply module 111, the food supply module 121, and to filling module 131. The second food packaging machine 102 comprises a packaging material supply module 112, a food supply module 122, and a filling module 132. The food packaging machine further comprises a hardware data processor 142 which is operably connected to the packaging material supply module 112, the food supply module 122, and to filling module 132. Both the hardware data processor 141 of the first food packaging machine 101 and the hardware data processor 142 of the second food packaging machine 102 are operably connected to a network data processing system 150 The network data processing system 150 is further connected to a plurality of separate network storage devices 161 and 162.

In another aspect, the present invention provides a system for packaging food comprising a plurality of food packaging machines wherein each of the food packaging machines comprises one of the network storage device. By having the food packaging machines comprises one network storage device each, it is possible to have the location of the network storage devices be as diverse as the locations of the food packaging machines. The protection of the network storage devices may thus be the same as that for the food packaging machine which is connected to the network data processing devices. The system for packaging food may comprise a plurality of preferably at least 10, more preferably at least 100, food packaging machines whereby each of the food packaging machines comprises one network storage device. Consequently, each food packing machine contributing its data to the packaged food production hash tree also has a local copy of the hash tree. The food safety data of each local machine can thus be verified with reference to the locally stored packaged food production hash tree. The locally stored packaged food production hash tree may, as a second step of verification, be compared to the packaged food production hash trees stored on network storage devices associated with at least one, preferably a plurality of other machines. These other machines may be located at sites separated from the location of the first food packaging machine and may be protected by independent and different access protection systems. Retroactively modifying the packaged food production hash tree would thus require gaining access to at least a majority of the network storage devices.

In FIG. 7, an exemplary embodiment of a system for packaging food comprising two food packaging machines according to the present invention is shown. The first food packaging machine 101 comprises a packaging material supply module 111, a food supply module 121, and a filling module 131. The food packaging machine further comprises a hardware data processor 141 which is operably connected to the packaging material supply module 111, the food supply module 121, and to filling module 131. The second food packaging machine 102 comprises a packaging material supply module 112, a food supply module 122, and a filling module 132. The food packaging machine further comprises a hardware data processor 142 which is operably connected to the packaging material supply module 112, the food supply module 122, and to filling module 132. Both the hardware data processor 141 of the first food packaging machine 101 and the hardware data processor 142 of the second food packaging machine 102 are operably connected to a network data processing system 150 The network data processing system 150 is further connected to a plurality of separate network storage devices 161 and 162. The first food packaging machine 101 comprises the first network storage device 161. The second food packaging machine 102 comprises the second network storage device 162.

In another aspect, the present invention provides a system for packaging food comprising a plurality of food packaging machines wherein each of the food packaging machines comprises a network data processing system and a network storage device. Each of the network data processing systems can thus be protected with the same access control that is protecting also the food packaging machine and the network storage device comprised in the same machine. Each of the hardware data processors in the food packaging machines may be operably connected to each one of the network data processing means. The operable connection be direct or may be indirect, such as via one or more of the other network data processing systems. The network data processing systems may be operable to distribute the received data among each of the other network data processing systems. Each of the hardware data processors may be directly and operably connected to the network data processing system comprised in the same food packaging machine as the hardware data processor. The network data processing units may be operably connected to the network storage devices.

In FIG. 8, an exemplary embodiment of a system for packaging food comprising two food packaging machines according to the present invention is shown. The first food packaging machine 101 comprises a packaging material supply module 111, a food supply module 121, and a filling module 131. The food packaging machine further comprises a hardware data processor 141 which is operably connected to the packaging material supply module 111, the food supply module 121, and to filling module 131. The second food packaging machine 102 comprises a packaging material supply module 112, a food supply module 122, and a filling module 132. The food packaging machine further comprises a hardware data processor 142 which is operably connected to the packaging material supply module 112, the food supply module 122, and to filling module 132. Both the hardware data processor 141 of the first food packaging machine 101 and the hardware data processor 142 of the second food packaging machine 102 are operably connected to a first network data processing system 151 and a second network data processing system 152. The network data processing systems 151 and 152 are further connected to a plurality of separate network storage devices 161 and 162. The first food packaging machine 101 comprises the first network data processing system 151 and the first network storage device 161. The second food packaging machine 102 comprises the second network data processing system 152 and the second network storage device 162.

In another aspect, the present invention provides a system for packaging food comprising a plurality of food packaging machines wherein the data processing units are each operable according to a joint consensus algorithm to append blocks of received data transactions to the packaged food production hash tree. Retroactive recreation or modification of a packaged food production hash tree thus requires access to a majority of the network processing devices in order to overcome the protection through the consensus algorithm. The network data processing systems may be stored at different, preferably widely separated, more preferably additionally independently protected against unauthorized physical and remote access. Identical instances of the appended packaged food production hash tree may be stored decentrally in the network storage devices. The food safety data of each local machine can thus be verified with reference to the locally stored packaged food production hash tree. The locally stored packaged food production hash tree may, as a second step of verification, be compared to the packaged food production hash trees stored on network storage devices associated with at least one, preferably a plurality of other machines. These other machines may be located at sites separated from the location of the first food packaging machine and may be protected by independent and different access protection systems. Retroactively modifying the packaged food production hash tree would thus require gaining access to at least a majority of the network storage devices.

In another aspect, the present invention provides a method for tracking data in a food packaging machine. The food packaging machine comprises a packaging material supply module, a food supply module, and filling module. The food packaging machine further comprises a hardware data processor operably connected to the packaging material supply module and operably connected to the food supply module. The hardware data processor is further operably connected to a network data processing system. The network data processing system is operably connected to a plurality of separate network storage devices. The network data processing system is operable to read from one of the network storage devices a packaged food production data hash tree, to append a data transaction to the packaged food production data hash tree, and to cause decentralised storage of identical instances of the appended packaged food production data hash tree in the plurality of network storage devices.

Each of the food packaging machines and their variations described herein are suitable for executing the method for tracking data in a food packaging machine.

With reference to the exemplary embodiment of the method shown in FIG. 9, the method 1000 for tracking data in a food packaging machine comprises the step 1010 of the package material supply module supplying packaging material to the filling module. The method comprises the step 1020 of the filling module forming a formed package from the packaging material. The method comprises the step 1030 of the hardware processor (e.g. hardware data processor 140) receiving a packaging material data record indicative of the packaging material batch currently supplied to the filling module. The method comprises the step 1040 of the food supply module supplying food to the filling module. The method comprises the step 1050 of the filling module filling the food into the package. The method comprises the step 1060 of the hardware processor receiving a food data record Indicative of the food batch currently supplied to the filling module. The method comprises the step 1070 of the hardware processor creating a food data transaction derived from data comprising a time stamp identifying the time at which the filling section filled the supplied food into the formed package, a machine data record identifying the filing module or the food packaging machine, all or part of the food data record, and all or part of the packaging material data record. The method comprises the step 1080 of the hardware processor sending the food data transaction to the network data processing system for the data transaction to be appended to the packaged food production data hash tree. The method comprises the step 1090 of the filling module sealing the filled package. The method comprises the step 1100 of the filling module outputting the sealed, formed, and filled package. The steps of the method do not necessarily need to be performed in the order described above and shown in FIG. 9, but may be arranged in any other suitable order.

The method may comprise receiving the appended packaged food production data hash tree from the network data processing system, where in the appended packaged food production data hash tree comprises the food data transaction appended by the network data processing system to the packaged food production data hash tree. The packaged food production data hash tree may be obtained by the network data processing system from at least one of the plurality of network storage devices.

All variations and details described herein with reference to the food packaging machine of the present invention and to the system for producing packaged food of the present invention apply mutatis mutandis also to the method for tracking data in a food packaging machine.

In another aspect, the present invention provides a computer program comprising instructions to cause the hardware processor (e.g. hardware data processor) of any food packaging machine described herein to execute the steps of the method for tracking food data transactions.

In another aspect, the present invention provides a method for tracking data in a system of food packaging machines comprising a first and a second food packaging machine. The first food packaging machine comprises a first packaging material supply module, a first food supply module, a first filling module. The second food packaging machine comprises a second packaging material supply module, a second food supply module, and a second filling module. The first food packaging machine further comprising a first hardware data processor operably connected to the first packaging material supply module and operably connected to the first food supply module. The second food packaging machine further comprising a hardware data processor (e.g. a second hardware data processor) operably connected to the second packaging material supply module and operably connected to the second food supply module. The first hardware processor and the second hardware processor are operably connected to a network data processing system. The network data processing system being operably connected to a plurality of separate network storage devices. The network data processing system being operable to read from one of the network storage devices a packaged food production data hash tree, to append a data transaction to the packaged food production data hash tree and to cause decentralised storage of identical instances of the appended packaged food production data hash tree in the plurality of network storage devices.

Each of the systems for producing packaged food and their variations described herein are suitable for executing the method for tracking data in a food packaging machine.

With reference to the exemplary embodiment of the process shown in FIG. 10, the method 2000 for tracking data in a system of food packaging machines according to the present invention comprises the step 2010 of the first package material supply module supplying packaging material to the first filling module. The method comprises the step 2020 of the first filling module forming a first formed package from the packaging material. The method comprises the step 2030 of the first hardware processor receiving a first packaging material data record indicative of the packaging material batch currently supplied to the first filling module. The method comprises the step 2040 of the second package material supply module supplying packaging material to the second filling module. The method comprises the step 2050 of the second filling module forming a second formed package from the packaging material. The method comprises the step 2060 the second hardware processor receiving a second packaging material data record indicative of the packaging material batch currently supplied to the filling module. The method comprises the step 2070 of the first food supply module supplying food to the filling module.

The method comprises the step 2080 of the first filling module filling the food into the first package. The method comprises the step 2090 of the first hardware processor receiving a first food data record indicative of the food batch currently supplied to the first filling module. The method comprises the step 2100 of the first hardware processor creating a first food data transaction derived from data comprising a time stamp identifying the time at which the first filling section filled the supplied food into the first formed package, a machine data record identifying the first filing module or the first food packaging machine, all or part of the first food data record, and all or part of the first packaging material data record. The method comprises the step 2110 of the first hardware processor sending the first food data transaction to the network data processing system for the data transaction to be appended to the packaged food production data hash tree. The method comprises the step 2120 the second food supply module supplying food to the second filling module. The method comprises the step 2130 the second filling module filling the food into the second package. The method comprises the step 2140 the second hardware processor receiving a second food data record indicative of the food batch currently supplied to the filling module. The method comprises the step 2150 the second hardware processor creating a second food data transaction derived from data comprising a time stamp identifying the time at which the second filling section filled the supplied food into the second formed package, a machine data record identifying the second filing module or the second food packaging machine, all or part of the second food data record, and all or part of the second packaging material data record. The method comprises the step 2160 of the second hardware processor sending the second food data transaction to the network data processing system for the data transaction to be appended to the packaged food production data hash tree. The method comprises the step 2170 of the first filling module sealing the filled first package. The method comprises the step 2180 of the first filling module outputting the sealed, formed, and filled first package. The method comprises the step 2190 of the second filling module sealing the filled second package. The method comprises the step 2200 of the second filling module outputting the sealed, formed, and filled second package. The steps of the method do not necessarily need to be performed in the order described above and shown in FIG. 10, but may be arranged in any other suitable order.

All variations and details described herein with reference to the food packaging machine of the present invention and to the system for producing packaged food of the present invention apply mutatis mutandis also to the method for tracking data in a system for packaging food.

In another aspect, the present invention provides a computer program comprising instructions to cause the hardware processor in the first food packaging machine in any system for packaging food described herein to execute the steps of the method for tracking food data transactions which are performed by the first food packaging machine.

Embodiments of methods and products (food packaging machine, system for packaging food) according to the disclosure are set out in the following items:

Item 1.
A food packaging machine (100) comprising
a packaging material supply module (110)
a food supply module (120)
a filling module (130)
the filling module being operable to
  form a package from packaging material supplied by the package material supply module
  fill food supplied by the food supply module into the formed package
  seal the filled package
  output the sealed, formed, and filled package
characterised in that
the food packaging machine further comprises a hardware data processor (140)
  operably connected to the packaging material supply module to receive a packaging material data record indicative of the packaging material batch currently supplied to the filling module
  operably connected to the food supply module to receive a food data record indicative of the food batch currently supplied to the filling module
  operable to create a food data transaction derived from data comprising
    a time stamp identifying the time at which the filling section filled the supplied food into the formed package,
    a machine data record identifying the filing module or the food packaging machine,
    all or part of the food data record
    all or part of the packaging material data record
  operably connected to a network data processing system (150),
    the network data processing system being operably connected to a plurality of separate network storage devices (161, 162),
    the network data processing system being operable to
      read from one of the network storage devices a packaged food production data hash tree
      append a data transaction to the packaged food production data hash tree
      cause decentralised storage of identical instances of the appended packaged food production data hash tree in the plurality of network storage devices
  operable to send the food data transaction to the network data processing system for the data transaction to be appended to the packaged food production data hash tree.

Item 2.
A food packaging machine (100) according to Item 2, wherein
the hardware data processor (140) is further operably connected to the filling module (130) to receive a filling data record indicative of at least one operational parameter of the filling module
and wherein
the hardware data processor is operable to create a food data transaction derived from data further comprising all or part of the filling data record.

Item 3.
A food packaging machine (100) according to Item 1 or 2, wherein the food packaging machine further comprises one of the network storage devices (162).

Item 4.
A food packaging machine (100) according to any of Items 1 to 3, wherein
the hardware data processor (140) is further operably connected to a second network data processing system (152) separate from the first network data processing system (151)
the second network data processing system being operably connected to a plurality of network storage devices (163, 164)

the second network data processing system being operable to
  read from one of the network storage devices a second packaged food production data hash tree
  append blocks of received data transactions to the second packaged food production data hash tree,
  cause decentralised storage of identical instances of the second packaged food production data hash tree in the network storage devices.

Item 5.

A food packaging machine (100) according to any of Items 1 to 4
wherein
  the hardware data processor (141, 142) of each food packaging machine is operably connected to the network data processing system (150) and
  the network data processing system is operably connected to a plurality of network storage devices.

Item 12.

A system for packaging food comprising a plurality of food packaging machines (101, 102) according to Item 11,
wherein
  each of the food packaging machines comprises one of the network storage devices (161, 162).

Item 13.

A system for packaging food comprising a plurality of food packaging machines (101, 102) according to Items 11 or 12, wherein
  each of the food packaging machines
    comprises a network data processing system
    comprises a network storage device.
  each of the hardware data processors in the food packaging machines is operably connected to all of the network data processing systems
  each of network data processing systems are operably connected to the network storage devices Item 14.

A system for packaging food comprising a plurality of food packaging machines (101, 102) according to any of Items 11 to 13,
wherein
  the network data processing systems are each operable according to a joint consensus algorithm to append blocks of received data transactions to the packaged food production hash tree,
  identical instances of the appended packaged food production hash tree are stored decentrally in the network storage devices.

Item 15.

A method for tracking food data transactions in a food packaging machine (100) according to any of Items 1 to 10
characterized in that
the method comprises the steps of the hardware processor
  receiving a packaging material data record indicative of the packaging material batch currently supplied to the filling module
  receiving a food data record indicative of the food batch currently supplied to the filling module
  creating a food data transaction derived from data comprising
    a time stamp identifying the time at which the filling section filled the supplied food into the formed package,
    a machine data record identifying the filing module or the food packaging machine,
    all or part of the food data record
    all or part of the packaging material data record
  sending the food data transaction to the network data processing system for the data transaction to be appended to the packaged food production data hash tree.

Item 16.

A computer program comprising instructions to cause the hardware processor in a food packaging machine according to any of Item 1 to 10 to execute the steps of the method for tracking food data transactions according to Item 15.

Item 17.

A method for tracking food data transactions in a system for packaging food according to any of Items 11 to 14, the system for packaging food comprising a first food packaging machine according to any of Items 1 to 10 and a second food packaging according to any of Items 1 to 10,
characterized in that
the method comprises the steps of
  the first hardware processor receiving a first packaging material data record indicative of the packaging material batch currently supplied to the first filling module
  the first hardware processor receiving a first food data record indicative of the food batch currently supplied to the first filling module
  the first hardware processor creating a first food data transaction derived from data comprising
    a time stamp identifying the time at which the first filling section filled the supplied food associated with first food data record into a first formed package made from the packaging material associated with first packaging material data record,
    a machine data record identifying the first filing module or the first food packaging machine,
    all or part of the first food data record
    all or part of the first packaging material data record
  the first hardware processor sending the first food data transaction to the network data processing system for the data transaction to be appended to the packaged food production data hash tree
  the second hardware processor receiving a second packaging material data record indicative of the packaging material batch currently supplied to the filling module
  the second hardware processor receiving a second food data record indicative of the food batch currently supplied to the filling module
  the second hardware processor creating a second food data transaction derived from data comprising
    a time stamp identifying the time at which the second filling section filled the supplied food associated with second food data record into a second formed package made from the packaging material associated with first packaging material data record,
    a machine data record identifying the second filing module or the second food packaging machine,
    all or part of the second food data record
    all or part of the second packaging material data record
  the second hardware processor sending the second food data transaction to the network data processing system for the data transaction to be appended to the packaged food production data hash tree.

Item 18.

A computer program comprising instructions to cause the hardware processor in the first food packaging machine in system for packaging food according to any of Item 11 to Item 14 to execute the steps of the method for tracking food data transactions according to Item 17 which are performed by the first food packaging machine.

The invention claimed is:

1. A food packaging machine comprising:
    a hardware data processor that is:
        (1) operably connected to a packaging material supply module of the food packaging machine and configured to receive, from the packaging material supply module, a packaging material data record including information identifying a batch of the packaging material currently supplied to a filling module of the food packaging machine,
        (2) operably connected to a food supply module of the food packaging machine and configured to receive, from the food supply module, a food data record including information identifying a batch of the food currently supplied to the filling module,
        (3) configured to create a food data transaction derived from data comprising:
            (a) a time stamp identifying the time at which the filling module filled food supplied by the food supply module into a formed package;
            (b) a machine data record identifying the filling module or the food packaging machine;
            (c) at least a portion of the food data record;
            (d) at least a portion of the packaging material data record; and
            (e) data relating to an earlier food data transaction created on the same food packaging machine;
        (4) operably connected to a first network data processing system,
        (5) configured to send the food data transaction to the first network data processing system for the food data transaction to be appended to a packaged food production data hash tree, and
        (6) configured to verify at least one of the food data record or the packaging material data record with the packaged food production data hash tree before creating the food data transaction.

2. The food packaging machine according to claim 1, wherein the hardware data processor is:
    further operably connected to the filling module and configured to receive a filling data record indicative of at least one operational parameter of the filling module; and
    configured to create the food data transaction derived from data further comprising at least a portion the filling data record.

3. The food packaging machine according to claim 1, further comprising one of a plurality of network storage devices operably connected to the first network data processing system.

4. The food packaging machine according to claim 1, wherein:
    the hardware data processor is operably connected to a second network data processing system separate from the first network data processing system; and
    the second network data processing system being:
        operably connected to a plurality of network storage devices, configured to read from one of the network storage devices a second packaged food production data hash tree, and configured to append blocks of received data transactions to the second packaged food production data hash tree; and
        configured to decentralize storage of identical instances of the second packaged food production data hash tree in the network storage devices.

5. The food packaging machine to claim 1, wherein:
    the hardware data processor is operably connected to a second network data processing system separate from the first network data processing system;
    the first and the second network data processing systems operably connected to the plurality of network storage devices; and
    the first network data processing system and the second data processing system are each operable to append blocks of received data transactions to the packaged food production data hash tree, and operable to store identical instances of the appended data hash tree decentrally in the network storage devices.

6. The food packaging machine according to claim 1, wherein the packaged food production data hash tree is a distributed ledger.

7. The food packaging machine according to claim 1, wherein the packaged food production data hash tree is a blockchain.

8. The food packaging machine according to claim 7, wherein the packaged food production data hash tree is a semi-public blockchain.

9. The food packaging machine according to claim 1, wherein the food data record configured to be received by the hardware data processor comprises a transaction stored in the food production data hash tree.

10. The food packaging machine according to claim 1, wherein the packaging material data record configured to be received by the hardware data processor comprises a transaction stored in the food production data hash tree.

11. A system for packaging food comprising a plurality of food packaging machines according to claim 1, wherein:
    the hardware data processor of each food packaging machine is operably connected to the network data processing system; and
    the network data processing system is operably connected to a plurality of network storage devices.

12. A system for packaging food comprising a plurality of food packaging machines according to claim 11, wherein:
    each of the food packaging machines comprises one of the network storage devices.

13. A system for packaging food comprising a plurality of food packaging machines according to claim 11, wherein:
    each of the food packaging machines comprises a network data processing system and a network storage device;
    each of the hardware data processors is operably connected to the network data processing systems; and
    each of network data processing systems are operably connected to the network storage devices.

14. A system for packaging food comprising a plurality of food packaging machines according to claim 11, wherein:
    the network data processing systems are each operable according to a joint consensus algorithm to append blocks of received data transactions to the packaged food production hash tree; and
    identical instances of the appended packaged food production hash tree are stored decentrally in the network storage devices.

15. A method, performed by a food packaging machine, for tracking food data transactions in the food packaging machine, wherein the food packaging machine comprises a hardware data processor, wherein the method comprises:
    receiving, from a packaging material supply module, a packaging material data record including information identifying a batch of packaging material currently supplied by the packaging material supply module to a filling module;

receiving, from a food supply module, a food data record including information identifying a batch of food currently supplied by the food supply module to the filling module;

creating a food data transaction derived from data comprising:
- a time stamp identifying the time at which the filling module filled the supplied food into a package formed from the supplied packaging material,
- a machine data record identifying at least one of the filling module or the food packaging machine,
- at least a portion of the food data record, and
- at least a portion of the packaging material data record, and
- data relating to an earlier food data transaction created on the same food packaging machine;

sending the food data transaction to a network data processing system for the food data transaction to be appended to a packaged food production data hash tree; and verifying at least one of the food data record or the packaging material data record with the packaged food production data hash tree before creating the food data transaction.

16. A computer program product comprising instructions, when executed by the hardware data processor, to execute the method according to claim 15.

17. A food packaging machine according to claim 1, wherein the packaged food production data hash tree includes a plurality of food data transactions created by a plurality of food packaging machines.

18. The method according to claim 15, wherein the package is formed from the supplied packaging material by the filling module.

19. The method according to claim 15, wherein the packaged food production data hash tree includes a plurality of food data transactions created by a plurality of food packaging machines.

20. The method according to claim 15, wherein the food data record includes at least a second food data transaction stored in the food production data hash tree.

* * * * *